(12) United States Patent
Roebuck

(10) Patent No.: US 10,628,495 B2
(45) Date of Patent: Apr. 21, 2020

(54) DOCUMENT IMPORTATION, ANALYSIS, AND STORAGE

(71) Applicant: HRB Innovations, Inc., Las Vegas, NV (US)

(72) Inventor: Eric R. Roebuck, Shawnee, KS (US)

(73) Assignee: HRB Innovations, Inc., Las Vegas, NV (US)

(*) Notice: Subject to any disclaimer, the term of this patent is extended or adjusted under 35 U.S.C. 154(b) by 303 days.

(21) Appl. No.: 15/084,808

(22) Filed: Mar. 30, 2016

(65) Prior Publication Data

US 2017/0286414 A1    Oct. 5, 2017

(51) Int. Cl.
```
G06F 16/93      (2019.01)
G06K 9/00       (2006.01)
G06K 9/18       (2006.01)
G06Q 40/00      (2012.01)
G06F 21/62      (2013.01)
```
(52) U.S. Cl.
CPC .......... *G06F 16/93* (2019.01); *G06F 21/6218* (2013.01); *G06K 9/00469* (2013.01); *G06K 9/18* (2013.01); *G06Q 40/123* (2013.12); *G06F 2221/2113* (2013.01)

(58) Field of Classification Search
CPC .. G06F 17/211; G06F 17/30011; G06F 21/31; G06F 21/6245; G06F 3/04842; G06Q 20/405; G06Q 20/3821; H04L 67/125; G06K 2209/01

See application file for complete search history.

(56) References Cited

U.S. PATENT DOCUMENTS

| | | | | |
|---|---|---|---|---|
| 2008/0216174 A1* | 9/2008 | Vogel | ................... | G06F 21/6245 726/22 |
| 2009/0025090 A1* | 1/2009 | Clement | ............ | G07C 9/00103 726/28 |
| 2009/0051961 A1* | 2/2009 | Ohsawa | .............. | G06F 21/6218 358/1.15 |
| 2010/0245938 A1* | 9/2010 | Coley | ............... | G06F 17/30011 358/474 |
| 2012/0260096 A1* | 10/2012 | Balinsky | ............. | G06F 21/6209 713/176 |
| 2014/0244456 A1* | 8/2014 | Huang | ................. | G06Q 40/123 705/31 |
| 2014/0258042 A1* | 9/2014 | Butler | ................ | G06Q 30/0627 705/26.63 |
| 2017/0109349 A1* | 4/2017 | Rosen | ................. | G06F 17/3012 707/999.003 |

* cited by examiner

*Primary Examiner* — Yuk Ting Choi
(74) *Attorney, Agent, or Firm* — Erise IP, P.A.

(57) ABSTRACT

Embodiments of the invention involve importing and storing a document from a user, including acquiring the document; analyzing the document to determine a set of identification information; determining a user account associated with the document based upon the set of identification information; determining a sensitivity level of the document; providing a certain level of access to the user account based upon the sensitivity level of the document; and storing the document in a document data store such that the document can be retrieved in association with the user account.

18 Claims, 4 Drawing Sheets

DOCUMENT IMPORTATION, ANALYSIS, AND STORAGE

BACKGROUND

1. Field

Embodiments of the invention relate to document importation, analysis, and storage for later access.

2. Related Art

It is common for persons to receive documents periodically that are not immediately needed by the person. It is advantageous to store the document, or a copy thereof, to be retrieved when the document is needed. The user will typically have a smart phone, tablet computer, or other computing device with which to store the document. However, simply taking a photograph or scanning the document results in the document being difficult to find later and requires local storage. Certain programs and applications of the prior art attempt to acquire and store documents remotely. However, these programs require detailed and repeated authentication, due to the sensitive nature of many documents. The need for detailed authentication slows and complicates the use of these programs, so as to reduce their usage frequency and user experience.

SUMMARY

Embodiments of the invention solve the above-mentioned problems by providing a computer program, a system, and a method for importing, analyzing, and storing documents with no or minimal authentication required from the user. Embodiments of the invention import the tax-related document, analyze the document to determine a document type and a set of identification information, and store the document such that it can be retrieved at a later time. Based upon a set of identification information, embodiments of the invention will identify a user account associated with the document such that the user can later retrieve it. Based upon a level of sensitivity of the document type, embodiments of the invention may allow a certain level of access to the user account.

A first embodiment of the invention is general directed to a non-transitory computer-readable storage medium having a computer program stored thereon for importing and storing a document from a user, wherein the computer program instructs at least one processing element to perform the following steps: acquiring the document; analyzing the document to determine a set of identification information; determining a user account associated with the document based upon the set of identification information; determining a sensitivity level of the document; providing a certain level of access to the user account based upon the sensitivity level of the document; and storing the document in a document data store such that the document can be retrieved in association with the user account.

A second embodiment of the invention is generally directed to document analyzer for receiving and storing a document, the document analyzer configured to perform the following steps: receiving the document; analyzing the document to determine a document type; analyzing the document to determine a set of identification information; determining a user account associated with the document based upon the set of identification information; determining a sensitivity level of the document; and providing a certain level of access to the user account based upon the sensitivity level of the document.

A third embodiment of the invention is generally directed to a computerized method of importing and storing a document from a user, the method comprising the following steps: acquiring the document; analyzing the document to determine a set of identification information; determining a user account associated with the document based upon the set of identification information; determining a sensitivity level of the document; providing a certain level of access to the user account based upon the sensitivity level of the document; and storing the document in a document data store such that the document can be retrieved in association with the user account.

Other embodiments of the invention are also directed to a system for acquiring and storing document. Still other embodiments may be directed to a user device having a computer program stored thereon for performing the discussed functions. Yet further embodiments may be directed to a server configured to perform the discussed functions remotely from the user device.

BRIEF DESCRIPTION OF THE DRAWING FIGURES

Embodiments of the invention are described in detail below with reference to the attached drawing figures, wherein.

Figure 1:
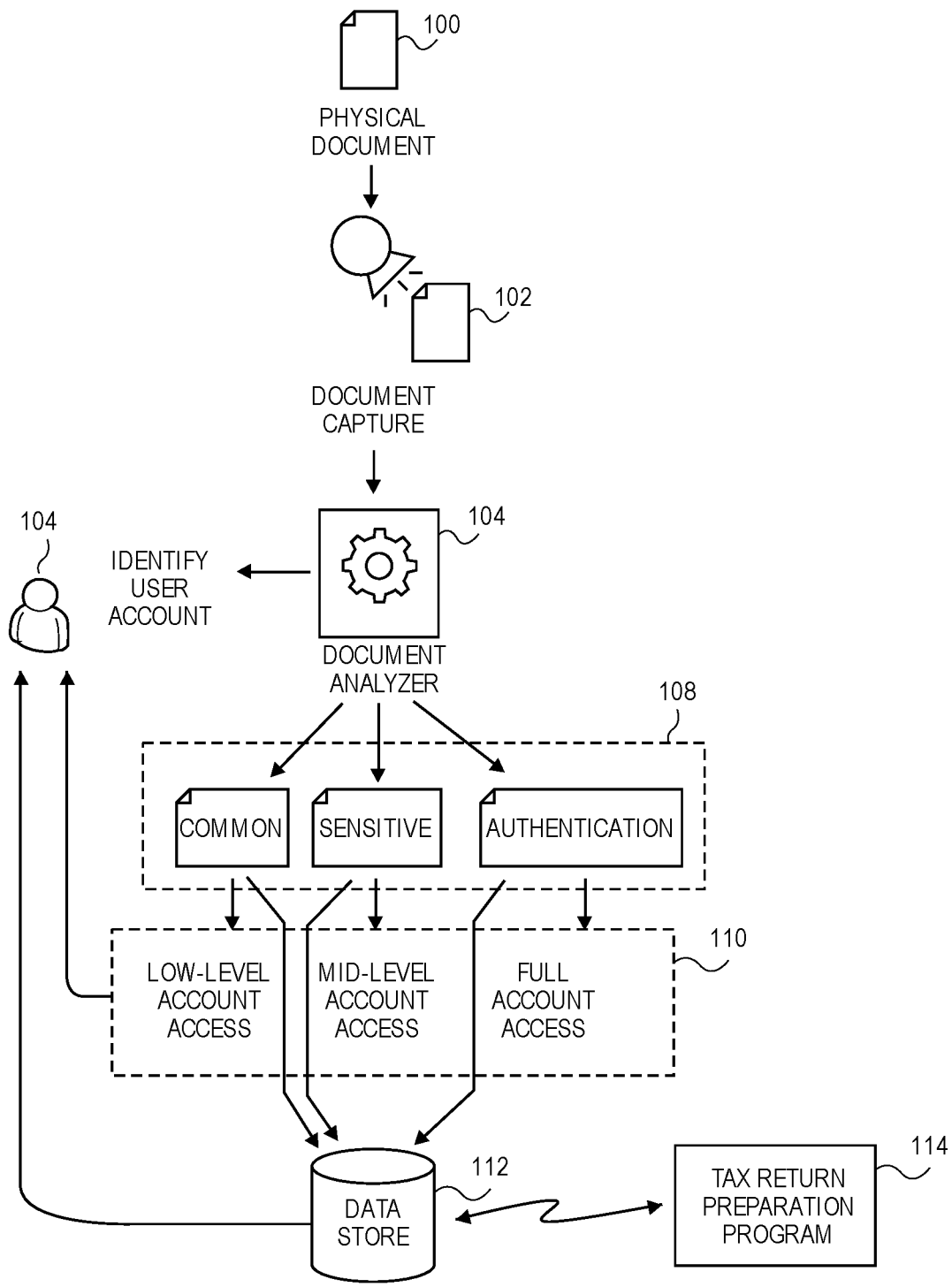
FIG. 1 is a flow diagram illustrating a one embodiment of the invention.

The drawing figures do not limit embodiments the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, embodiments of the invention can include a variety of combinations and/or integrations of the embodiments described herein.

Embodiments of the invention comprise a computer program, a computerized method, and a system for importing, analyzing, and storing tax-related documents with no or minimal authentication required from the user. Embodiments of the invention import the tax-related document, analyze the document to determine a document type and a set of identification information, and store the document such that it can be retrieved during preparation of a tax return. Based upon set of identification information, embodiments of the invention will identify a user account associated with the tax-related document such that the user can later retrieve it. Based upon a level of sensitivity of the document type, embodiments of the invention may allow a certain level of access to the user account. It should be appreciated that tax-related documents are only an exemplary use of embodiments of the invention. Other embodiments of the invention may be used for any other type of document. Tax-related documents are discussed herein for simplicity.

Turning to the figures, an exemplary embodiment of the invention is illustrated in FIG. 1. Broadly, FIG. 1 shows how a physical document is captured, imported, analyzed, and stored. In Step 100, a physical document is received or acquired by the user. In Step 102, the document is captured, such as by photographing the document, scanning the document, or by otherwise acquiring a representation (e.g., an electronic copy) of the document. Steps 100 and 102 may be performed prior to the method of the invention, or as a step thereof.

In Step 104, a document analyzer reads the representation. This can include an optical character recognition ("OCR") of the document. It should be appreciated that in embodiments of the invention, as Step 104 is being performed, the user has not logged in or otherwise verified their identity to the system. For example, the system may be running on a smart phone of the user associated with an app downloaded to the smart phone. As such, when the system receives the representation of the document, the system must analyze the document to determine how and where to save the document as well as how much, if any, access to a user account should be granted by virtue of the user having access to the document.

In Step 106, the document analyzer identifies a user account associated with the document. For example, in the tax preparation field, the user account may be related to tax return preparations for previous tax years. The document analyzer reads the representation of the document to locate identification information on the document. This may be included on the face of the document, in the metadata associated with the document, or the like. Based upon the identification information, the document analyzer may then access a set of user accounts to attempt to locate a user account that includes identical, substantially identical, or related identification information. If no associated user account can be identified, the system may initiate a new user account that can be later accessed by the user to retrieve the document.

In Step 108, the document analyzer determines a sensitivity level of the document. In some embodiments, this is performed by determining a type of the document and determining the sensitivity level of the document based upon the type. For example, a Form W2 may have a high sensitivity level as these documents are not readily available to the public and include a significant amount of sensitive information. As shown, exemplary sensitivity levels that may be determined by the system are common-level documents, sensitive-level documents, and authentication-level documents.

Based upon the determined sensitivity level in Step 108, in Step 110 the system may grant limited or even full access to the user account. If a user account was identified in Step 106, the user may be granted limited or full access to the user account based upon the sensitivity level of the document. For example, a common-level document may be granted low-level account access, a sensitive-level document may be granted mid-level account access, and an authentication-level document may be granted full account access. These various levels and document types are discussed in more depth below.

In Step 112, the document is stored in a data store. The document may be stored with metadata indicative of the associated user account, a sensitivity level of the document, information indicative of the user, information indicative of the user device, and other information to aid in the later retrieval and association. In Step 114, a tax return preparation program may access the data store to retrieve the document and associated information. This allows the document to assist in the preparation of the tax return in an easy and efficient manner.

Before discussing these steps in more detail, terms used herein will be discussed for clarity. The following discussion provides examples and broad, non-limiting discussions of the terms herein. It should be appreciated, as discussed below, that the field of tax returns and tax return preparations are only an exemplary field of the invention. Some embodiments of the invention may be related to other entities and organizations for the capture of documents for later retrieval and use.

The "user" is the person who is utilizing or interacting with the system. The user acts, or purports to act, on behalf of the taxpayer that is associated with the document. Examples of users include the taxpayer, an authorized friend or family member of the taxpayer, a tax professional, a financial professional, or other person. In some embodiments, the user is connected to the system while the discussed steps are performed. In other embodiments, the user is no longer connected to the system while the discussed steps are performed. The user may connect to the system by utilizing a user device, such as a smart phone, a tablet computer, a laptop computer, a smart watch, and other computing devices (as discussed below).

A "document" is a set of information. The document may be a physical document, such as printed on paper, or an electronic document, such as a text file. The document contains, or purports to contain, information relevant to the user and/or the user's tax return for a current tax year. The document may also be any other set of data or information that is potentially relevant to the user. For example, a small portion of an e-mail may be considered a document even if it is not stored and transmitted as a traditional document.

A "taxpayer" includes any entity, either a legal or natural person, that files a tax return with a government taxing authority. The taxpayer may also be a first spouse and a second spouse filing a joint return. Taxes to be paid can be United States Federal Income Tax, income tax for the various states within the United States, corporate taxes, partnership taxes, LLC taxes, property taxes, tariffs, or other taxes. Typically, the taxpayer provides information relevant to themselves and the amount of tax owed in the form of the tax return. The tax return is discussed more below. It should also be noted that in embodiments of the invention, the taxpayer is instead a beneficiary of a government entitlement program, as discussed below.

Embodiments of the invention can be utilized by any of several types of entities. Embodiments of the invention may be used by a tax professional, a taxpayer using a self-preparation tax return product, a financial professional, or a third party acting on behalf of either or both of the tax professional or the taxpayer.

In embodiments of the invention, a self-preparation tax return product utilizes the invention. For example, if the taxpayer uses a self-preparation tax return product, such as tax preparation software, embodiments of the invention provide a service to the taxpayer in conjunction with using the tax preparation software. The service may be provided to the user as a value-added benefit to the tax preparation software or as a pay service. Alternatively, if embodiments of the invention are used by the tax professional, the tax professional may use the service in conjunction with preparation and filing of the tax return.

In embodiments of the invention, the invention is utilized by a tax professional. The tax professional includes any entity, either a legal person or natural person, or a computer program adapted to preparing taxes or providing other financial services. Examples of tax professionals include, but are not limited to, the following: a company, such as H&R Block, Inc.®, or an employee or agent of such a company; software adapted to prepare tax returns or other financial documents; and a person, legal or natural, who advises or assists the taxpayer in preparing their own tax return. The tax professional may also comprise a database for storing of tax related documents.

In other embodiments of the invention, the invention is utilized by a financial professional. A financial professional includes any entity, either a legal person or a natural person, or a computer program adapted to provide financial services or products. For example, the financial professional could be a financial advisor, accountant, attorney, etc. By way of another example, the financial professional could be a website for monitoring the taxpayer's financial assets and liabilities. The financial professional may utilize embodiments of the invention to assist customers in retaining documents generated or processed by the financial professional. For example, if the financial professional is a bank, the bank may utilize embodiments of the invention to store Form 1099-INTs related to their customers such that the customers can easily access these documents when the customers begin tax return preparation during the tax-filing season. The financial professional may provide these as free or pay services to help bolster the ease and convenience of the customer in preparing their tax return.

In one embodiment, the taxpayer enters the tax-related documents, such as W2s and 1099s, into the self-preparation tax return program. In another embodiment, the taxpayer provides the tax-related documents electronically to the tax professional, who stores the documents until tax return preparation begins via a professional-preparation tax return program.

The tax return is essentially a report filed with the appropriate government taxing authority, such as the IRS in the case of U.S. federal income tax. Typically, the tax return contains information used to calculate the tax due. Typically, the tax return is either printed or hand-written on a form generated by the taxing authority, such as the Form 1040. However, the tax return could be on another type of form, a financial document, or other document. On the tax return, the taxpayer or tax professional calculates the taxes due. To assist in the calculation and to allow the taxing authority to verify the calculations, the tax return contains pertinent information associated with the taxpayer for the tax period. The tax return can be either written, digital, or a combination of both. In other embodiments, information relevant to the taxpayer and the tax to be paid are provided on other various forms and documents.

Tax information associated with any tax return and found on tax-related documents includes one or more of the following: name of taxpayer; name of taxpayer's spouse, if any; address; a social security number ("SSN"); bank account information; wages; retirement investments; insurance distributions; income tax withholdings for the tax period; capital gains and losses; dependents, including number of dependents, names, and identification information; tax deductible expenses, such as charitable contributions; and like information.

Tax returns are typically due in a tax return filing season following the tax year. A tax year is typically a calendar or fiscal year upon which the tax is calculated. A tax period may be another length of upon which the tax is calculated, such as a month, a quarter, half of a year, two years, five years, etc. It should be appreciated that the "current tax year" and "current tax period" as used herein, refers to the tax year or tax period for which the tax return relates. For example, a tax return submitted in March 2016 typically relates to the 2015 tax year. This is because the taxes accrue ending December 31 of the tax year and the tax return is submitted at some point in the following calendar year as prescribed by law (e.g., by April $15^{th}$). During the tax year, various tax-related documents may be provided to the user. As the user may not yet be legally allowed to file their tax return (because the user is currently in the tax year, prior to the tax return filing season) the user is required to store or file the document until such time that filing the tax return is permitted by law.

Figure 2:
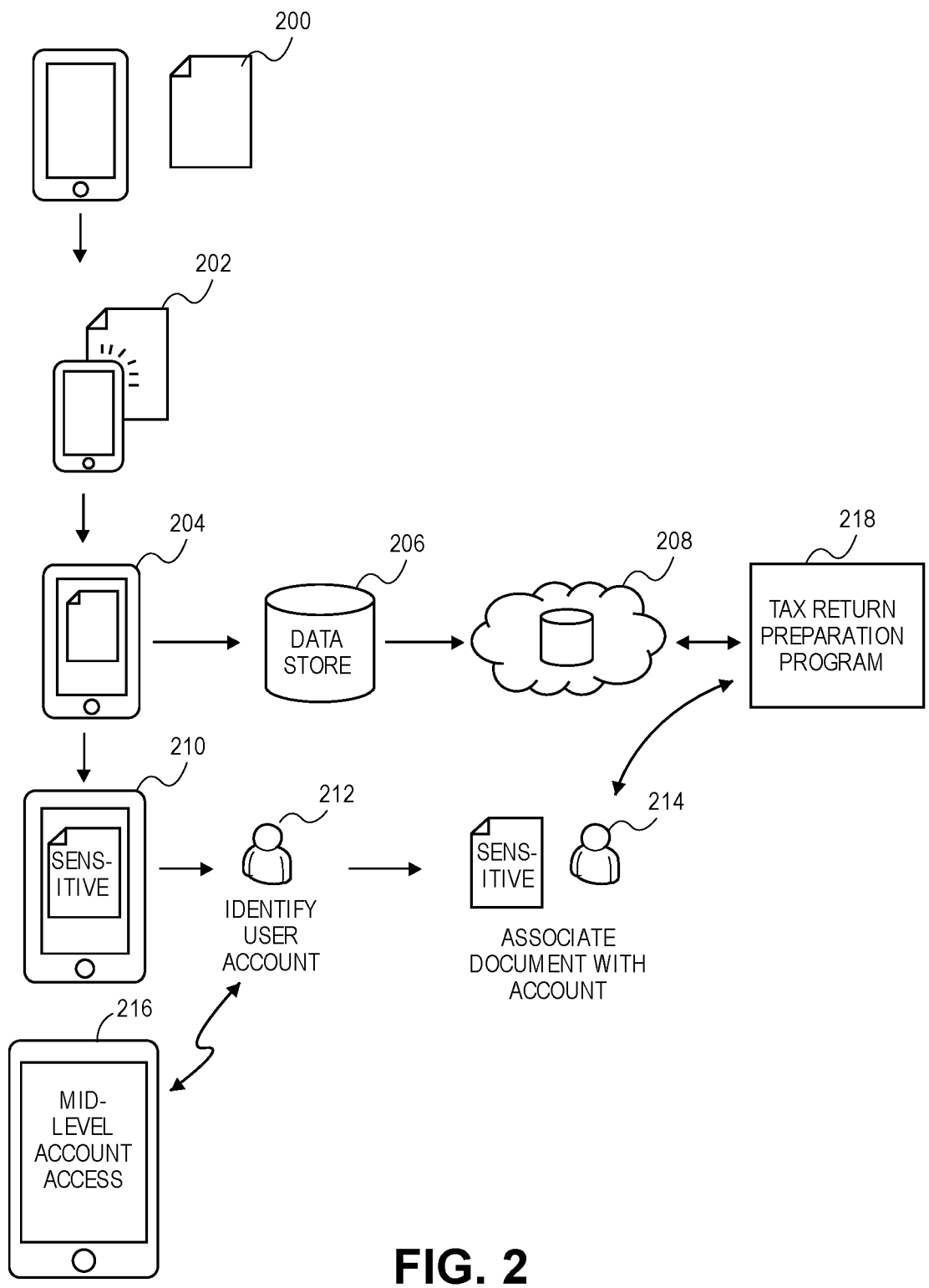
FIG. 2 is a flow diagram illustrating another embodiment of the invention that operates on a user device.

Returning to the Figures, FIG. 2 shows another exemplary embodiment of the invention. FIG. 2 illustrates how the user captures the document so as to store the document and gain limited access to the account. As an example, the user may receive a physical copy of a tax-related document. The user may then desire to save a digital copy of the physical tax-related document. This allows the user to store, shred, or otherwise discard the physical copy of the tax-related document. However, due to the sensitive nature of many tax-related documents, storing the tax document locally on a smart phone or other device presents several problems such as the likelihood of memory and device failure and the likelihood of hackers accessing the tax-related document from the device. Similarly, storing the document in a cloud-based account also presents problems in that an authentication is required to log into the account, especially in order to associate the document with a user account. This can be time consuming and cause frustration in the user. The user will therefore utilize the system to safely store the tax-related document in an efficient manner.

In Step 200, the user obtains a physical copy of the tax-related document. For example, the user may receive a Form 1099 based upon completion of a contract for a customer. As another example, the user may receive receipt from the purchase of a tax-deductible item. As still another example, the user may receive a Form W2 from their employer. Typically, embodiments of the invention are utilized during the taxing year, such that tax-related documents can be easily stored for an extended period of time. This allows the user to begin storing the tax-related document long before the user is considering beginning to prepare the tax return for that tax year so as to reduces the administrative burden of finding the documents in anticipation of preparing the tax return.

In Step 202, the user captures a digital representation of the physical tax-related document. This can be performed by taking a digital photograph of the tax-related document, scanning the tax-related document, or by another method of capturing the document. The representation includes at least a portion of the information that was on the physical document. The representation may be a complete representation (such as a photograph that shows the representation largely as the physical document existed) or a partial representation (such as a table of data that includes the data from the physical document, but not the original layout). In some embodiments, the document may be received as a digital document, such as a digital receipt or the like. In these embodiments, the representation may be the document as received.

In Step 204, the representation is analyzed by the system. This analysis determines how or where to store the representation and generates metadata or a categorization so as to assist in retrieving the document. This can include an OCR of the document so as to make the document computer-readable. The representation may be presented to the user for review. The user may ensure that the representation captured all relevant data. The user may also be able to add notes or comments to the representation. Notes may indicate when, where, and from whom the document was received; why the document is being stored; what type of document; and what is the tax-related purpose of the document.

In Step 206, the representation is stored in a local data store. The local data store may be in or associated with the device (such as a smart phone or computer). The local data store may permanently store the representation or may store the representation only until the representation has been successfully stored externally. In Step 208, the representation is stored in a remote data store. The remote data store may be accessed by sending the representation over a wired or wireless connection. For example, the device may send the representation over a mobile broadband network to a remote cloud-based data store associated with the tax-return preparation program. As another example, the device may send the representation via a secure WiFi signal to a remote data store associated with a financial professional.

In Step 210, the document analyzer evaluates the document to determine a sensitivity level of the document. In some embodiments of the invention, this includes determining a type of the document (as discussed below) and determining a sensitivity level based upon the type. For example, the document analyzer may determine that the document is a Form 1099-INT (for example, by reading "1099-INT" from the top corner of the document and/or comparing the document to a sample fillable Form 1099-INT). Based upon this document type, the sensitivity level may be determined or retrieved. In other embodiments, the document analyzer identifies the types of information that appear on the document. For example, the document may include a taxpayer name, a taxpayer SSN, and a taxpayer deposit bank account number. Based upon these types of information, the document analyzer may determine that the document is a sensitive-level document. In some embodiments, both the document type and the types of information are both analyzed. For example, if the document is only partially completed such that the document does not contain all of the sensitive information that would typically be present on the document, the document analyzer may find a lower sensitivity level for the document. The document analyzer may also verify that at least a portion of the information on the document is accurate (such as comparing the information to the user account) before allowing any level of access.

In Step 212, the system determines a user account that is associated with the document. The user account is typically pre-existing but may be new. The system analyzes the information in the representation to generate a set of identification information. The set of identification information may include information such as taxpayer name, address, phone number, SSN, taxpayer identification number, and other types of information. The set of identification information is then compared against existing user accounts to determine whether there is a user account that contains an exact match, a substantial match, or related information indicative of a match. For example, if the found user account includes the same SSN, taxpayer first name, and taxpayer address, but has a different taxpayer last name, this may be indicative that the user account is correct and the taxpayer has changed his or her last name. If no user account is located, the system may generate a new user account for the user (such as by generating a unique user identifier from which the user can later identify and retrieve that document). The system may additionally or alternatively inquire of the user for account information in the event that the user account cannot be automatically identified. For example, the user may not yet have an account or the account may have been closed or in the name of another (such as a current or former spouse).

In Step 214, the system associates the document with the user account. For example, as the document is stored in the remote data store (as discussed above in Step 208) account information may be attached or associated with the document. Similarly, the document may be stored in a location or data store associated with the user account. If the user account could not be identified, the document may be associated with a user account that was previously identified for the device. For example, a user having previously entered a Form W2 and being identified with the correct user account, can enter receipts (that do not necessarily include identification information for the user) and these receipts will be associated with the same user account.

In Step 216, the user is provided with limited or full account access based upon the determined sensitivity level of the document. This will typically be a limited access based upon the likelihood that someone other than a genuine user would have access to the document. For example, if the document is a common-level document, such as a receipt, the user may be provided with a very low level of account access (such as viewing the name of the tax professional associated with the user account and allowing the user to setup an appointment with that tax professional) without allowing any sensitive data to be presented to the user. This would prevent potential fraud by malfeasants uploading documents related to others in an attempt to gain access to sensitive data for that person.

In Step 218, a tax return preparation program or other system may access the document, related information, and related account information. This streamlines the tax return preparation process. By associating the document with the user account, the document can be automatically or easily accessed by the user logging into the user account. For example, when preparing the tax return during the tax-filing season following the tax year, the user logs into their tax return preparation program. The user may then be presented with all of the documents that were saved during the tax year to verify that these documents do in fact relate to the user and are relevant. Information from these documents may then be automatically input into the tax return calculations and forms.

Figure 3:
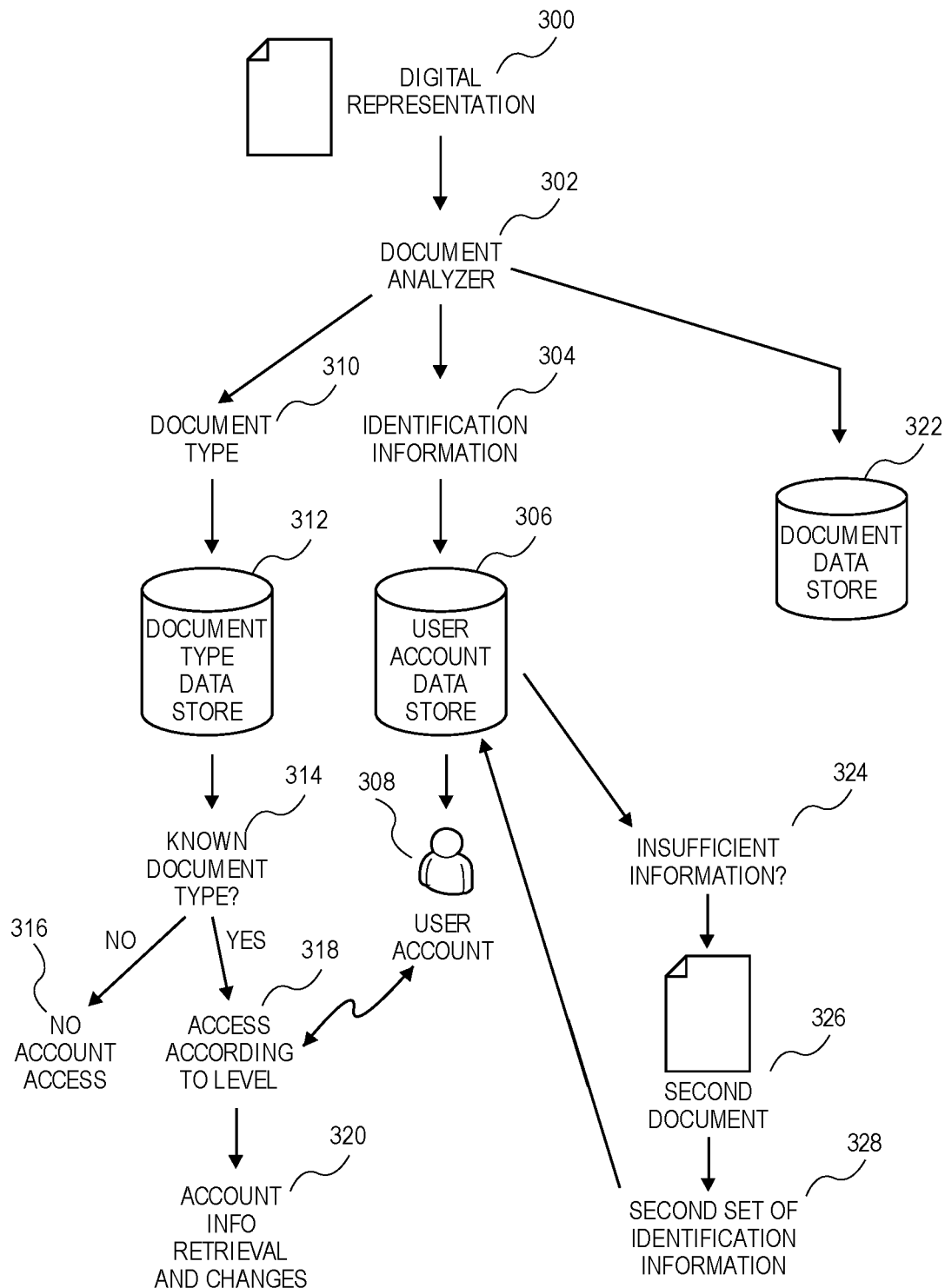
FIG. 3 is a flow diagram illustrating yet another embodiment of the invention that accesses various data stores in performing the discussed functions.

FIG. 3 illustrates another embodiment of the invention comprising steps performed by the document analyzer. The document analyzer may be local to the device, remote from the device, or a combination of both. For example, the device may take a photograph of the physical document and send the photograph to a remote server without performing any local analysis. As another example, the device may perform all of the analysis locally while pulling information from various remote data stores. Some of the discussed method steps may be performed locally, some may be performed remotely, and some steps may be split in that a portion is performed locally and another portion performed remotely. Similarly, in some embodiments, the document analyzer may access and/or receive data from a remote data store while operating locally.

In Step 300, the document analyzer takes, creates, receives, requests, or otherwise acquires a digital representation of the document. For example, the document analyzer may utilize a camera of the device so as to take a photograph of the physical document. As another example, the document analyzer may receive the digital representation via a scanner attached to a computer. As yet another example, the document analyzer may receive the digital representation as a direct upload or an attachment to an e-mail message. As yet a further example, the document analyzer may receive numerous documents from an employer.

In Step 302, the document analyzer begins analyzing the digital representation. In embodiments of the invention, the document analyzer performs three general functions: identifying a correlating user account (discussed below in Steps 304 through 308), identifying a sensitivity level of the document (discussed below in Steps 310-320), and storing the document (discussed below in Steps 322). As with other method steps discussed herein, it should be appreciated that these steps may be performed chronologically, simultaneously, or in any order.

In Step 304, the document analyzer locates and calculates a set of identification information that appears in or is associated with the document. This may include performing an OCR on the document so as to render the document as computer readable. The set of identification information may be pulled from numerous locations on the document. For example, the document analyzer may locate a taxpayer name, SSN, and related information on the document. In some embodiments, locating the set of identification information may be done in conjunction with the determination of the document type. For example, some document types may include identification information in a certain location or box on the document.

The set of identification information may also be generated at least in part from metadata that accompanies the document. Metadata associates one set of data with another set of data. The metadata may be embedded in the digital representation, stored externally in a separate file that is associated with the digital representation, otherwise associated with the digital representation, or all of the above. Embedding the identification information into the same file with the digital representation can be advantageous because it allows the metadata to travel as part of the data it describes. Externally stored metadata may also have advantages, such as ease of searching and indexing. The metadata may also be stored in a human-readable format, such that a user can access, understand, and edit the metadata without any special software.

Based upon the set of identification information, in Step 306 the document analyzer accesses a user account data store to identify a user account that corresponds with the set of identification information. The user account data store is typically remote from the user device, because storing information related to all or many user accounts on the user device would render this information susceptible to discovery and exploitation, in addition to being unnecessarily wasteful of memory on the user device. In embodiments of the invention, the document analyzer sends the set of identification information (or a subset thereof) to an external analyzer or may directly access the user account data store.

In embodiments of the invention, the user account is pre-existing. For example, the user may use a tax return preparation program to prepare a tax return in a prior tax year. Accordingly, the user will have a user account with the tax return preparation program (or with a tax professional, or the like). In the upcoming or current tax year, the user may retrieve the tax-related document. As discussed above, it would be disadvantageous for user experience to require the user to log into their user account or otherwise authenticate themselves. The document analyzer therefore identifies the user account at least in part independently of the user identifying their user account, in embodiments of the invention.

In Step 308, the user account is identified from the user account data store. The identified user account will match all, or substantially all of the set of identification information. The user account may have an identification number or other indicator. The document analyzer may therefore retrieve that indicator and store that indicator in the metadata associated with the representation. This will allow the document to be associated with the user account, regardless of where or how the document is stored, as discussed below. The user account may have various information associated therewith for the identification in relation to the document. For example, if the document includes substantial employer information (such as a Form W2 would include), the document analyzer may verify that the user account included the same employer as a strong indication that the user account is correct and that the document is genuine.

In some instances, the document analyzer may identify more than one potential user account. If the document analyzer identifies more than one potential user account, the document analyzer may present information indicative of the user accounts to the user and present a selection for the user to pick one of the accounts that is their user account. In other embodiments, the document analyzer may request at least some authentication information from the user so as to verify which of the potential user accounts is most appropriate for the user.

In some instances, the document analyzer may fail to identify a user account that matches the set of identification information. In these instances, the system may present to the user an option to create a new account, and/or generate a new indicator for the new account. For example, the user may be automatically set up with a new user account via the indicator. When the user later joins the tax return preparation program to prepare the user's tax return, the user will input information into the tax return preparation program in setting up the account or preparing the tax return. The system may then retrieve the documents that were added throughout the year by associating the indicator (and all associated documents) with the newly created user account. Similarly, if the user joins the tax return preparation program from the device, the system may authenticate that the user is associated with the user account that was created by the device.

In Step 310, the document analyzer determines a document type. The document analyzer reads the document to identify information that may be indicative of the type of document and/or a sensitivity level of the document. For example, if the document includes information related to funds received, goods or services rendered, and a customer name, the document analyzes may determine that the document is a receipt in some form. As another example, if the document includes extensive employer information for the user, the document analyzer may conclude that this is the document originated from the employer. The document analyzer may also consider metadata that accompanies the document to identify a document type. For example, if the representation of the document was submitted electronically (such as via an e-mail), the document may already include metadata indicative of the type of document.

In Step 312, the document analyzer accesses or requests information from a document type data store. The document type data store may include examples or forms of common documents. For example, most Form W2s have a general layout and architecture. As such, a document that is laid out in a similar fashion to the Form W2 and includes similar information may be considered by the document analyzer to be a form W2. In some embodiments, the document analyzer may send information indicative of the information appearing on and the layout of the document to be compared against document forms and information in the document type data store. In other embodiments, the document analyzer requests all document types that meet various criteria and then determines a document type based upon the received information.

In Step 314, the document analyzer determines whether the document is one of a known document type (such that appears in or is associated with the document type data store). In some embodiments, the known document type is a specific type of document, such as a Form W2. In some embodiments, the known document type is a general type of document, such as a receipt or an employer document.

In Step 316, if the document is determined to not be of a known document type the document analyzer may allow for no account access to the user. In other embodiments, even if the document type cannot be determined; the user may none-the-less be allowed low-level access based upon the types of information appearing on the document. For example, if the document includes the taxpayer name, SSN, and employer information that was determined to be genuinely associated with a known user account (such as discussed in Step 308 above), the system may nonetheless determine a sensitivity level for the document based upon the type and amount of information appearing on the document (and how much of that information can be independently verified).

In Step 318, if the document belongs to a document type that is known in the document type data store, the document analyzer provides or allows account access that is consistent with the document type. In some embodiments, the document analyzer provides the user with the account access. In other embodiments, the document analyzer may associate an authentication level with the user such that the user can access the user account up to the specified level. For example, the document analyzer may, in embodiments of the invention, be a component or a system of a tax return preparation program. The document analyzer may then provide an indication to the tax return preparation program of the level of access to which the tax return preparation program should allow the user to access the user account.

As illustrated in FIG. 1, if the document type is a common-level document, the document analyzer may provide for a low-level of account access. The low-level of account access may allow for only minimal access to information, such as viewing the name and location of the tax professional associated that created the last tax return and allowing the user to setup an appointment with that tax professional. The user is typically not allowed to change the account or access sensitive information in the account. For example, if the user submits a receipt, the user would not be allowed to view the sensitive user information, such as the SSN, because the user has not demonstrated that they are in fact the user. The user may be permitted to log into the account so as to provide sufficient authorization to allow the user to access more detailed account information and make changes, but on the merits of the submitted document (and for expediency purposes) the user is provided with a low-level of account access.

If the document type is a sensitive-level document, the document analyzer may determine that the user is entitled to a mid-level of account access. For example, if the document is determined to be a Form W2, that type of document is unlikely to be accessible to any other than the taxpayer and an authorized agent of the employer. Therefore, the system can be fairly certain that the authorized agent would be unlikely to commit tax fraud, but nonetheless cannot be sure. As the likelihood of fraud is reduced (as compared to a receipt), the document analyzer authorizes or allows a mid-level of account access. Examples of a mid-level of account access may include the ability to perform basic tax planning functions and the ability to view a simplified version of the previous year's tax return.

If the document type is an authentication-level document, the document analyzer may determine that the user is entitled to full account access. An authentication-level document may be a letter of authorization from the tax professional, an identification card, a full copy of a previous year's tax return, or other authentication that the user is in fact genuine. This allows the user to authenticate themselves even if they cannot remember their log in information or are otherwise unable to gain full account access. In some embodiments of the invention, the authentication-level document must be independently verified by a human operator. In some embodiments, there are no authentication-level documents and the user must actually enter their account information in order to be granted access to the account.

In some embodiments of the invention, the access level may also be determined by the amount of verified information on the document. For example, some Form W2s include specific codes thereon related to a taxpayer situation, such as dependent care benefits, 401k enrollment, healthcare benefits, and the like. Embodiments of the invention may therefore access the user account to determine whether previous tax returns and user account information are consistent with these specific codes. Guessing the correct code would be difficult for a malfeasant to achieve if attempting to gain access to the account via the Form W2, so the matching of the information gives an indication that the document is genuine.

In Step 320, the user is allowed to retrieve account information and make changes to the account in accordance to their security level, as discussed above. The user may also be allowed to retrieve the previously stored documents and have access to the information that appeared on those documents (as this would not release to the user any more information than the user previously had). If the user requests access to the account in excess of the granted access level, the user may be invited to enter their account information or otherwise authenticate themselves. In this way, the user need not enter account information until necessary to perform the various functions.

In embodiments of the invention, the access level of the user may increase based upon the number and type of documents uploaded. For example, if the user has uploaded five separate sensitive-level documents, the document analyzer may determine that the five separate sensitive-level documents entitle the user to full account access. Further, the document analyzer may presume that later entered documents belong to the same user account as previously entered documents. For example, if the user has previously entered sensitive-level documents that denote the set of identification information, submission of a receipt that includes no identification information will be presumed to belong to the same user account as the previous sensitive-level documents.

In Step 322, the document analyzer stores the representation of the document in a document data store. The document analyzer may also associate information with the document such as information indicative of the corresponding user account, the document type, the authentication level of the document, the device that received the document, the iteration of the document analyzer that performed the analysis, the time and location of the analysis, etc. This may help in categorizing and retrieving the document in the future. For example, if the document analyzer associates the document with an incorrect user account, the tax return preparation program may nonetheless be able to locate the document by searching the metadata of other documents.

In some embodiments of the invention, in Step 324 if the user account is unknown and cannot be identified, the system may hold the document until more information or documents are received. For example, if the user scans a generic receipt without any user information, the system may store or hold the document until more information is received, such as the acquisition of another document by the same user device. Because it is unlikely that the user device is used to enter documents associated with unrelated persons, the device may presume that the earlier unidentified document is associated with the same taxpayer as the later identified document. The earlier received document may be a first document and the later received document may be a second document. Upon identification of the user account associated with the second document, the first document is also associated with the same user account. The set of identification information of the second document may therefore be used to identify the appropriate user account for the first document if the identification information of the first document is insufficient to properly determine the user account.

In some embodiments of the invention, the system acquires a first document, such as the receipt discussed above or another type of document with minimal identification information. The system then analyzes the first document to determine a first set of identification information. This may include the items of information that can be discerned, such as a user name or the like. The system may then determine that the first set of identification information is below a certain threshold for user account determination. For example, the user name may be insufficient to identify a user account with acceptable certainty. In some embodiments, the system may search a user account data store to determine whether the information available is sufficient. For example, if the user has a unique name this may be sufficient to identify the user account. In other embodiments, the system may not consult the user account data store unless there are certain definitive identification information present, such as a social security number for the user. Based upon the first set of identification information being below the certain threshold for user account determination, the system then stores the first document into a temporary storage location. The temporary storage location may be local to the device or remote from the device.

In Step 326, the system acquires a second document. A similar method is used to analyze the second document to determine a second set of identification information in Step 328. Upon a determination that the second set of identification information is above said certain threshold for user account determination, the system will identify a user account associated with the second set of identification information. The system will then store both the second document and the first document in a document data store such that the document can be retrieved in association with the user account. As discussed above, the system may assume that the device is used to enter documents for a single user. In other embodiments, the system may compare the first set of identification information to the second set of identification information to determine whether each is consistent with the other. In some instances, the second document will be received after the first document. In other instances, the second document will be received and validated first. Then, when the first document is received and there is insufficient information to identify the user account, the system will analyze the second document as discussed above.

In embodiments of the invention, the document data store is remote from the user device and is associated with the tax professional. In other embodiments, the document data store is local to the user device. In some embodiments, the document is stored in more than one document data store in disparate locations, such that a failure of one document data store will not destroy the document.

While the disclosure has heretofore referred to taxing authorities, tax returns, and taxpayers. It should be appreciated that in other embodiments, the invention is directed to entities other than taxing authorities, such as an administrative agency, company, or other organization. The administrative agency may be associated with a government entitlement program, such as the Social Security Administration or Medicaid. The administrative agency may additionally, or in the alternative, be associated with a regulatory program, such as the Environmental Protection Agency or the Securities and Exchange Commission. The company or organization may be associated with or performing the functions of, a government entity, or it may be a for-profit or not-for-profit entity unrelated to the government. For example, the company may be a bank that captures documents related to a bank account of the user and associates the information with the bank account based upon the information appearing on the document. As another example, embodiments of the invention are directed to the capture and storage of documents independent of any external entity. These embodiments may capture and store documents and associate the documents with pre-established accounts or categories automatically.

In these embodiments, the "taxpayer" may instead be a "beneficiary," a "citizen," a "customer," an "employee," a "third party," etc. While most of the present disclosure is directed to the field of taxes, this is only an exemplary field of use. For example, if the "taxing authority" is the Social Security Administration, then the "taxpayer" would be referred to as a "beneficiary." This disclosure is therefore not intended to be limiting, but instead provide an easy-to-understand exemplary embodiment of the invention.

Figure 4:
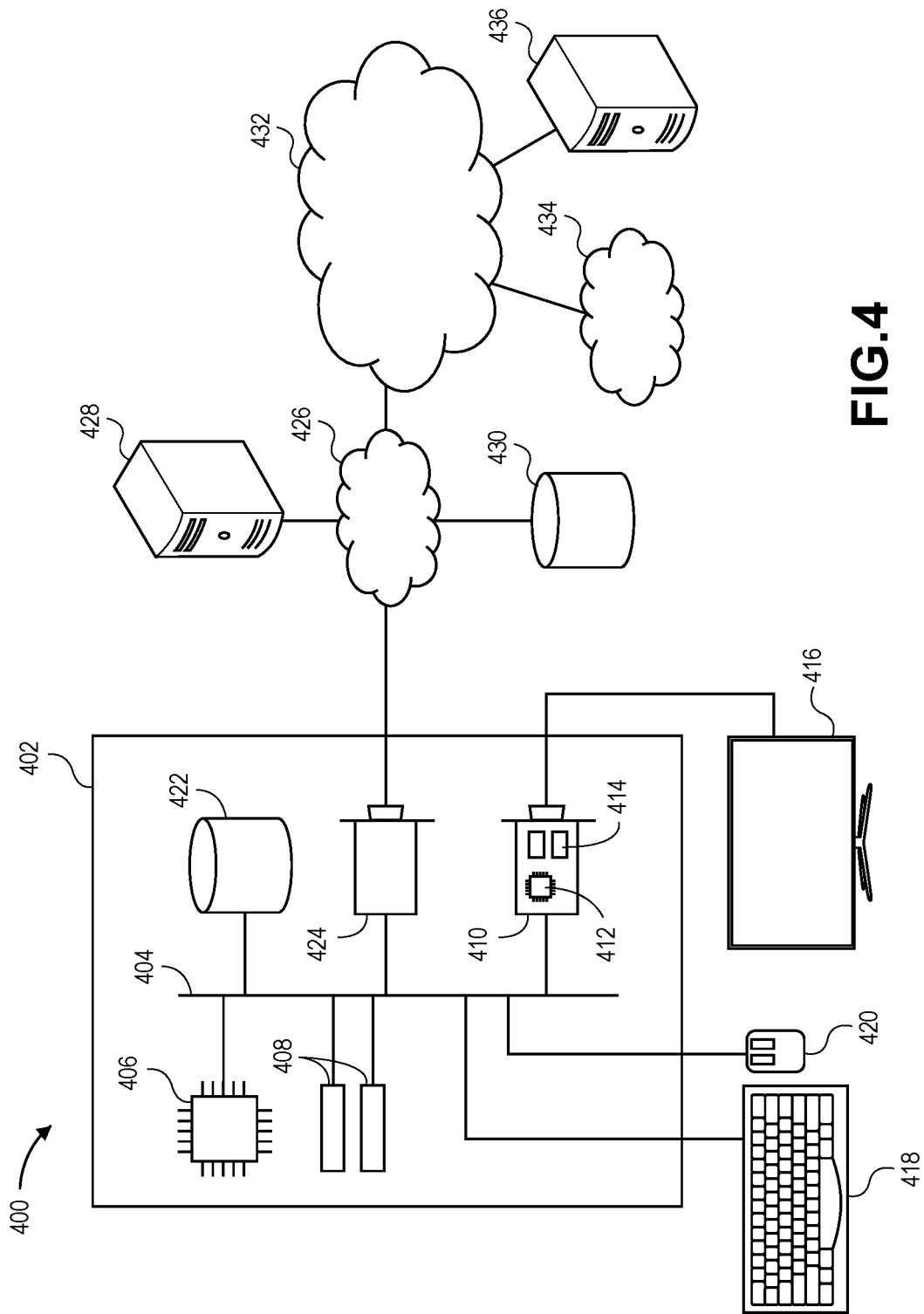
FIG. 4 is a system diagram illustrating various hardware components of embodiments of the invention.

Turning to FIG. 4, the physical hardware that makes up the system will now be discussed. The system 400 comprising an exemplary hardware platform that can form one element of certain embodiments of the invention is depicted. Computer 402 can be a desktop computer, a laptop computer, a server computer, a mobile device such as a smartphone or tablet, or any other form factor of general- or special-purpose computing device. Depicted with computer 402 are several components, for illustrative purposes. In some embodiments, certain components may be arranged differently or absent. Additional components may also be present. Included in computer 402 is system bus 404, whereby other components of computer 402 can communicate with each other. In certain embodiments, there may be multiple busses or components may communicate with each other directly. Connected to system bus 404 is central processing unit (CPU) 406. Also attached to system bus 404 are one or more random-access memory (RAM) modules 408.

Also attached to system bus 404 is graphics card 410. In some embodiments, graphics card 404 may not be a physically separate card, but rather may be integrated into the motherboard or the CPU 406. In some embodiments, graphics card 410 has a separate graphics-processing unit (GPU) 412, which can be used for graphics processing or for general purpose computing (GPGPU). Also on graphics card 410 is GPU memory 414. Connected (directly or indirectly) to graphics card 410 is display 416 for user interaction. In some embodiments no display is present, while in others it is integrated into computer 402. Similarly, peripherals such as keyboard 418 and mouse 420 are connected to system bus 404. Like display 416, these peripherals may be integrated into computer 402 or absent. Also connected to system bus 404 is local storage 422, which may be any form of computer-readable media, and may be internally installed in computer 402 or externally and removably attached.

Finally, network interface card (NIC) 424 is also attached to system bus 404 and allows computer 402 to communicate over a network such as network 426. NIC 424 can be any form of network interface known in the art, such as Ethernet, ATM, fiber, Bluetooth, or Wi-Fi (i.e., the IEEE 802.11 family of standards). NIC 424 connects computer 402 to local network 426, which may also include one or more other computers, such as computer 428, and network storage, such as data store 430. Local network 426 is in turn connected to Internet 432, which connects many networks such as local network 426, remote network 434 or directly attached computers such as computer 436. In some embodiments, computer 402 can itself be directly connected to Internet 432.

The computer program of embodiments of the invention comprises a plurality of code segments executable by the computing device for performing the steps of various methods of the invention. The steps of the method may be performed in the order discussed, or they may be performed in a different order, unless otherwise expressly stated. Furthermore, some steps may be performed concurrently as opposed to sequentially. Also, some steps may be optional. The computer program may also execute additional steps not described herein. The computer program, system, and method of embodiments of the invention may be implemented in hardware, software, firmware, or combinations thereof using the system, which broadly comprises server devices, computing devices, and a communication network.

The computer program of embodiments of the invention may be responsive to user input. As defined herein user input may be received from a variety of computing devices including but not limited to the following: desktops, laptops, calculators, telephones, smartphones, or tablets. The computing devices may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The server devices and computing devices may include any device, component, or equipment with at least one processing element and at least one memory element. The processing element may implement operating systems, and may be capable of executing the computer program, which is also generally known as instructions, commands, software code, executables, applications ("apps"), and the like. The at least one processing element may comprise processors, microprocessors, microcontrollers, field programmable gate arrays, and the like, or combinations thereof. The at least one memory element may be capable of storing or retaining the computer program and may also store data, typically binary data, including text, databases, graphics, audio, video, combinations thereof, and the like. The at least one memory element may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to the at least one memory element, the server devices may further include file stores comprising a plurality of hard disk drives, network attached storage, or a separate storage network.

The computing devices may specifically include mobile communication devices (including wireless devices), work stations, desktop computers, laptop computers, palmtop computers, tablet computers, portable digital assistants (PDA), smart phones, smart watches, wearable technology, and the like, or combinations thereof. Various embodiments of the computing device may also include voice communication devices, such as cell phones and/or smart phones. In preferred embodiments, the computing device will have an electronic display operable to display visual graphics, images, text, etc. In certain embodiments, the computer program facilitates interaction and communication through a graphical user interface (GUI) that is displayed via the electronic display. The GUI enables the user to interact with the electronic display by touching or pointing at display areas to provide information to the system.

The communication network may be wired or wireless and may include servers, routers, switches, wireless receivers and transmitters, and the like, as well as electrically conductive cables or optical cables. The communication network may also include local, metro, or wide area networks, as well as the Internet, or other cloud networks. Furthermore, the communication network may include cellular or mobile phone networks, as well as landline phone networks, public switched telephone networks, fiber optic networks, or the like.

Embodiments of the invention directed to the computer program may perform any or all of the above-discussed steps. The computer program may run on computing devices or, alternatively, may run on one or more server devices. In certain embodiments of the invention, the computer program may be embodied in a stand-alone computer program (i.e., an "app") downloaded on a user's computing device or in a web-accessible program that is accessible by the user's computing device via the communication network. As used herein, the stand-along computer program or web-accessible program provides users with access to an electronic resource from which the users can interact with various embodiments of the invention.

In embodiments of the invention, users may be provided with different types of accounts. Some accounts may be previously existing, such as associated with a tax return preparation program. Each type of user account may provide their respective users with unique roles, capabilities, and permissions with respect to implementing embodiments of the invention. For instance, the taxpayer may be provided with a user account that permits the taxpayer to access embodiments of the invention that are applicable to uploading and storing documents. Additionally, the tax professional or financial professional may be provided with a tax/financial professional account that permits the tax professional or financial professional to access embodiments of the invention that are applicable to accessing the documents, verifying their customer, preparing the tax return, etc. In addition, any number and/or any specific types of account are provided to carry out the functions, features, and/or implementations of the invention. Upon the user, tax professional, and/or financial professional logging in to the electronic resource for a first time, they may be required to provide various pieces of identification information to create their respective accounts. Such identification information may include, for instance, personal name, business name, email address, phone number, or the like. Upon providing the identification information, the taxpayer, third party, and/or tax professional may be required to enter (or may be given) a username and password, which will be required to fully access the user account.

Although embodiments of the invention have been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A non-transitory computer-readable storage medium having a computer program stored thereon for storing a tax-related digital document, wherein the computer program instructs at least one processing element to perform the following steps:
   acquiring the digital document that is a representation of a physical document from a user that is not authenticated;
   analyzing the digital document to determine a set of identification information from the digital document that appeared on the physical document;
   determining a user account associated with the digital document by comparing the set of identification information from the digital document with a set of user information associated with the user account;
   determining a sensitivity level of the digital document, wherein the sensitivity level is determined at least in part on a first set of information obtained from the digital document that appeared on the physical document;
   providing, to the user, a certain level of access to the user account based upon the sensitivity level of the digital document;
   storing the digital document in a document data store such that the digital document can be retrieved in association with the user account; and
   automatically updating tax information associated with the user based on a second set of information obtained from the digital document,
   such that the tax information is updated without the system needing to authenticate the user.

2. The non-transitory computer readable storage medium of claim 1,
   wherein the user account is a user account associated with a tax return preparation program.

3. The non-transitory computer readable storage medium of claim 1, wherein the step of acquiring the digital document includes taking a digital photograph of the physical document.

4. The non-transitory computer readable storage medium of claim 1, wherein the step of acquiring the digital document includes performing an optical character recognition on the digital document.

5. The non-transitory computer readable storage medium of claim 1, wherein the step of determining the user account includes accessing a user account data store and comparing the set of identification information against a plurality of user accounts within the user account data store.

6. The non-transitory computer readable storage medium of claim 1, wherein the sensitivity level of the digital document is determined at least in part by comparing the first set of information obtained from the digital document to the set of user information associated with the user account.

7. The non-transitory computer readable storage medium of claim 1, wherein said certain level of access to the user account is determined to allow no access to the user account.

8. The non-transitory computer readable storage medium of claim 1, wherein the step of storing the digital document in the document data store includes associating user account information with a set of metadata associated with the digital document, such that the digital document can be located via the metadata.

9. The non-transitory computer readable storage medium of claim 1, wherein the step of determining a sensitivity level of the digital document includes accessing a document type data store and determining whether the digital document is associated with a known document type.

10. The non-transitory computer readable storage medium of claim 1,
    wherein the digital document is a first digital document,
    wherein the physical document is a first physical document,
    wherein the step of determining the user account associated with the first digital document is performed by analyzing a second digital document to determine the set of identification information,
    wherein the second digital document is different than the first digital document and received later than the first digital document,
    wherein the second digital document is associated with a second physical document,
    wherein the second physical document is different than the first physical document.

11. A computerized method comprising the following steps:
    acquiring a first digital document from an unauthenticated user which is representative of a first physical document;

analyzing the first digital document to determine a first set of identification information from the first digital document that appeared on the first physical document;

determining that the first set of identification information from the first digital document is below a certain threshold for user account determination;

storing the first digital document into a temporary storage;

acquiring a second digital document from an unauthenticated user which represents a second physical document;

analyzing the second digital document to determine a second set of identification information from the second digital document that appeared on the second physical document;

determining that the second set of identification information from the second digital document is above said certain threshold for user account determination;

identifying a user account associated with the second set of identification information by comparing the second set of identification information with a set of user information associated with the user account;

comparing the second set of identification information with the first set of identification information; and storing the second digital document and, based on said comparison, the first digital document in a document data store such that the first digital document and the second digital document can be retrieved in association with the user account, automatically updating tax information associated with the user based on a second set of information obtained from the digital document, such that the tax information is updated without the system needing to authenticate the user.

12. The computerized method of claim 11, wherein the step of determining the user account includes accessing a user account data store and comparing the second set of identification information against a plurality of user accounts within the user account data store, wherein said certain level of access to the user account is based upon a data type, wherein the step of storing the second digital document and the first digital document in the document data store includes associating user account information with a first set of metadata associated with the first digital document and a second set of metadata associated with the second digital document, such that the second digital document and the first digital document can each be located via the metadata.

13. A computerized method for storing a tax-related digital document comprising the steps of:

receiving the digital document from an unauthenticated user which is representative of a physical document;

analyzing the digital document to determine a document type and a set of identification information from the digital document that appeared on the physical document;

determining a user account associated with the digital document by comparing the set of identification information from the digital document with a set of user information associated with the user account;

determining a sensitivity level of the digital document, wherein the sensitivity level is determined at least in part from the document type, wherein the sensitivity level is determined at least in part on a first set of information obtained from the digital document; and storing the digital document into the user account such that the digital document can be retrieved at a later time, automatically updating tax information associated with the user based on a second set of information obtained from the digital document, such that the tax information is updated without the system needing to authenticate the user.

14. The computerized method of claim 13, wherein the user account is a user account associated with a tax return preparation program.

15. The computerized method of claim 13, wherein the document type is determined at least in part by comparing the digital document to information in a document type data store to determine if the digital document is analogous to any known document type.

16. The computerized method of claim 13, wherein the set of identification information is determined at least in part by retrieving information from the digital document based upon the known document type.

17. The computerized method of claim 13, wherein the user account is determined by accessing a user account data store located remotely, wherein the digital document is stored in association with the user account.

18. The computerized method of claim 13, wherein at least a portion of the steps are performed on a user device.

* * * * *